US012743476B2

(12) United States Patent
Williams et al.

(10) Patent No.: US 12,743,476 B2
(45) **Date of Patent: *Sep. 22, 2026**

(54) UNIFORM RESOURCE IDENTIFIER ENCODING

(71) Applicant: CoStar Realty Information, Inc., Washington, DC (US)

(72) Inventors: Heidemarie W. Williams, Homer Glen, IL (US); Adam Fischer, Mokena, IL (US); Tod Kuwahara, South Pasadena, CA (US)

(73) Assignee: CoStar Realty Information, Inc., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,803

(22) Filed: Jun. 12, 2024

(65) Prior Publication Data

US 2024/0330389 A1 Oct. 3, 2024

Related U.S. Application Data

(63) Continuation of application No. 17/087,919, filed on Nov. 3, 2020, which is a continuation of application (Continued)

(51) Int. Cl.
*G06F 16/955* (2019.01)

(52) U.S. Cl.
CPC ........ *G06F 16/9566* (2019.01); *G06F 16/955* (2019.01)

(58) Field of Classification Search
CPC ........................... G06F 16/9566; G06F 16/955
See application file for complete search history.

(56) References Cited

U.S. PATENT DOCUMENTS 6,240,360 B1 5/2001 Phelan
6,804,700 B1 * 10/2004 Terek ..................... H04L 61/30 707/E17.115

(Continued)

FOREIGN PATENT DOCUMENTS

CN 104850602 8/2015
EP 1840512 10/2007

OTHER PUBLICATIONS

CA Office Action in Canadian Appln. No. 2920825, dated Sep. 9, 2019, 3 pages.

(Continued)

*Primary Examiner* — Jesse P Frumkin
(74) *Attorney, Agent, or Firm* — Fish & Richardson P.C.

(57) ABSTRACT

Methods, systems, and apparatus, including computer programs encoded on a computer storage medium, for receiving a query including search parameters; selecting one or more of the search parameters; for each of the selected parameters: generating a natural language representation of the selected parameter, and determining a rank of the selected parameter among the one or more selected parameters; generating a uniform resource identifier comprising the natural language representations of the selected parameters arranged in an order based on the ranks; obtaining one or more search results identified as responsive to the query; and providing the uniform resource identifier and the one or more search results for output.

37 Claims, 6 Drawing Sheets

Related U.S. Application Data

No. 16/110,063, filed on Aug. 23, 2018, now Pat. No. 10,846,354, which is a continuation of application No. 15/042,895, filed on Feb. 12, 2016, now Pat. No. 10,083,244.

(56) References Cited

U.S. PATENT DOCUMENTS

| | | | | |
|---|---|---|---|---|
| 7,293,012 | B1 * | 11/2007 | Solaro | G06F 16/951 |
| 7,363,308 | B2 | 4/2008 | Dillon | |
| 7,886,032 | B1 * | 2/2011 | Louz-On | G06F 16/951 709/224 |
| 7,886,217 | B1 * | 2/2011 | Henzinger | G06F 16/958 715/205 |
| 9,081,861 | B2 | 7/2015 | Lloyd | |
| 9,244,931 | B2 | 1/2016 | Radinsky | |
| 9,298,838 | B2 | 3/2016 | Boudreau | |
| 10,083,244 | B2 | 9/2018 | Williams et al. | |
| 10,318,913 | B2 * | 6/2019 | Uslontsev | G06Q 50/40 |
| 10,678,819 | B2 | 6/2020 | Boudreau et al. | |
| 10,846,354 | B2 | 11/2020 | Williams et al. | |
| 2005/0080908 | A1 * | 4/2005 | Allen | G06F 16/9566 707/E17.115 |
| 2007/0055745 | A1 | 3/2007 | Moricz | |
| 2007/0233695 | A1 | 10/2007 | Boudreau | |
| 2008/0140626 | A1 * | 6/2008 | Wilson | G06F 16/951 |
| 2008/0222083 | A1 | 9/2008 | Lim et al. | |
| 2010/0131535 | A1 | 5/2010 | Lin | |
| 2010/0269108 | A1 | 10/2010 | Boudreau | |
| 2010/0332493 | A1 | 12/2010 | Haas | |
| 2011/0244882 | A1 | 10/2011 | Hancock | |
| 2012/0072918 | A1 | 3/2012 | Zhong | |
| 2013/0091115 | A1 * | 4/2013 | Brake | G06F 16/951 707/E17.108 |
| 2013/0304845 | A1 | 11/2013 | Sanjeev | |
| 2014/0025657 | A1 * | 1/2014 | Dorfman | G06F 16/9537 707/711 |
| 2014/0215316 | A1 | 7/2014 | Guo | |
| 2014/0222696 | A1 * | 8/2014 | Ashby | G06Q 50/16 705/313 |
| 2014/0279793 | A1 | 9/2014 | Wohlstadter | |
| 2014/0330865 | A1 | 11/2014 | Xue | |
| 2014/0358911 | A1 | 12/2014 | McCarthy | |
| 2015/0081440 | A1 | 3/2015 | Blemaster | |
| 2015/0205834 | A1 | 7/2015 | Keeton et al. | |
| 2015/0242536 | A1 | 8/2015 | Surkov et al. | |
| 2015/0264082 | A1 * | 9/2015 | Belva | H04L 63/1433 726/25 |
| 2017/0010763 | A1 | 1/2017 | Mitchell | |
| 2017/0235732 | A1 | 8/2017 | Williams et al. | |
| 2017/0286545 | A1 | 10/2017 | Hewitt et al. | |
| 2019/0007792 | A1 | 1/2019 | Boudreau et al. | |
| 2019/0121832 | A1 | 4/2019 | Williams et al. | |
| 2021/0006640 | A1 | 1/2021 | Aoki | |
| 2021/0133271 | A1 | 5/2021 | Williams et al. | |
| 2024/0330388 | A1 | 10/2024 | Williams et al. | |
| 2024/0330390 | A1 | 10/2024 | Williams et al. | |
| 2024/0346101 | A1 | 10/2024 | Williams et al. | |

OTHER PUBLICATIONS

Developer.Mozilla.org [online], "History: pushState() method," available on or before Sep. 10, 2015 via Internet Archive: Wayback Machine URL<https://web.archive.org/web/20150910094408/https://developer.mozilla.org/en-US/docs/Web/API/History/pushState>, last updated Jan. 12, 2024, retrieved on Jun. 25, 2024, retrieved from URL<https://developer.mozilla.org/en-US/docs/Web/API/History/pushState>, 4 pages.
Advisory Action in U.S. Appl. No. 17/087,919, mailed on Apr. 1, 2024, 2 pages.
Direction.com [online], "URL Structure 101: Formatting URLs that Boost SEO," Apr. 18, 2024, retrieved Nov. 20, 2024, retrieved from URL <https://direction.com/seo-url-structure/#author>, 16 pages.
Notice of Allowance in U.S. Appl. No. 15/042,895, mailed on Jul. 9, 2018, 9 pages.
Office Action in U.S. Appl. No. 15/042,895, mailed on May 11, 2018, 19 pages.
Office Action in U.S. Appl. No. 16/110,063, mailed on Apr. 17, 2020, 32 pages.
Office Action in U.S. Appl. No. 16/110,063, mailed on Jul. 29, 2020, 7 pages.
Office Action in U.S. Appl. No. 17/087,919, mailed on Aug. 21, 2024, 95 pages.
Office Action in U.S. Appl. No. 17/087,919, mailed on Feb. 29, 2024, 34 pages.
Office Action in U.S. Appl. No. 17/087,919, mailed on May 28, 2024, 36 pages.
Office Action in U.S. Appl. No. 17/087,919, mailed on Nov. 24, 2023, 32 pages.
Office Action in U.S. Appl. No. 18/740,784, mailed on Aug. 19, 2024, 103 pages.
Office Action in U.S. Appl. No. 18/740,803, mailed on Aug. 20, 2024, 78 pages.
Office Action in U.S. Appl. No. 18/740,810, mailed on Aug. 15, 2024, 59 pages.
Supplemental Notice of Allowance in U.S. Appl. No. 15/042,895, mailed on Jul. 20, 2018, 5 pages.
Thegray.com [online], "Best Practices for Faceted Navigation & SEO: eCommerce Facets, Filters, and Sort Order," Aug. 30, 2022, retrieved Nov. 20, 2024, retrieved from URL <https://thegray.company/blog/best-practices-for-faceted-navigation-seo>, 9 pages.
Thegray.company.com [online], "What's in an SEO-friendly URL? Best Practices for URLs," Feb. 8, 2023, retrieved Nov. 20, 2024, retrieved from URL <https://thegray.company/blog/whats-in-an-seo-friendly-url>, 8 pages.
Searchenginejournal.com [online], "An SEO Guide to URL Parameter Handling," Dec. 30, 2019, retrieved Sep. 12, 2024, retrieved from URL <https://www.searchenginejournal.com/technical-seo/url-parameter-handling/>, 19 pages.
Susodigital.com [online], "A Complete Guide to Handling URL Parameters," Jun. 24, 2023, retrieved Sep. 12, 2024, retrieved from URL <https://susodigital.com/blog/handling-url-parameters>, 10 pages.
Webmasters.stackexchange.com [online], "Can I use a query parameter for SEO, or do I need to create a URL path for each page?," May 3, 2019, retrieved Sep. 12, 2024, retrieved from URL <https://webmasters.stackexchange.com/questions/122640/can-i-use-a-query-parameter-for-seo-or-do-i-need-to-create-a-url-path-for-each>, 3 pages.
Blog.lunatech.com [online], "What every web developer must know about URL encoding," Feb. 3, 2009, retrieved on Jan. 13, 2025, retrieved from URL <https://blog.lunatech.com/posts/2009-02-03-what-every-web-developer-must-know-about-url-encoding>, 21 pages.
Developers.Google.com [online], "Dynamic URLs vs. static URLs," Sep. 22, 2008, retrieved on Jan. 14, 2025, retrieved from URL <https://developers.google.com/search/blog/2008/09/dynamic-urls-vs-static-urls>, 5 pages.
Launchschool.com [online], "What is a URL?," Nov. 28, 2015, retrieved on Jan. 13, 2025, retrieved from URL <https://launchschool.com/books/http/read/what_is_a_url>, 5 pages.
Mysiteauditor.com [online], "Top 10 Most Important SEO Tips for URL Optimization," Dec. 28, 2014, retrieved on Jan. 14, 2025, retrieved from URL <https://mysiteauditor.com/blog/top-10-most-important-seo-tips-for-url-optimization/>, 10 pages.
Office Action in U.S. Appl. No. 17/087,919, mailed on Dec. 10, 2024, 114 pages.
Office Action in U.S. Appl. No. 18/740,803, mailed on Dec. 12, 2024, 100 pages.
Rfc-editor.org [online], "STD 66," Jan. 2005, retrieved on Jan. 13, 2025, retrieved from URL <https://www.rfc-editor.org/info/std66>, 2 pages.
Rfc-editor.org [online], "Uniform Resource Identifier (URI): Generic Syntax," Jan. 2005, retrieved on Jan. 14, 2025, retrieved from URL <https://www.rfc-editor.org/rfc/pdfrfc/rfc3986.txt.pdf>, 61 pages.
Robertnyman.com [online], "The importance of a semantic URL," Mar. 16, 2007, retrieved on Jan. 13, 2025, retrieved from URL <https://robertnyman.com/2007/03/16/the-importance-of-a-semantic-url/>, 10 pages.

(56) References Cited

OTHER PUBLICATIONS

Sitepoint.com [online], "Which URL is Right?," Jan. 21, 2009, retrieved on Jan. 13, 2025, retrieved from URL <https://www.sitepoint.com/which-url-is-right/>, 8 pages.
SmashingMagazine.com [online], "Introduction to URL Rewriting," Nov. 2, 2011, retrieved on Jan. 14, 2025, retrieved from URL <https://www.smashingmagazine.com/2011/11/introduction-to-url-rewriting/>, 22 pages.
Tantek.com [online], "How many ways can you slice a URL and name the pieces?," Aug. 26, 2011, retrieved on Jan. 14, 2025, retrieved from URL <https://tantek.com/2011/238/b1/many-ways-slice-url-name-pieces>, 5 pages.
Office Action in U.S. Appl. No. 17/087,919, mailed on May 5, 2025, 23 pages.
Office Action in U.S. Appl. No. 18/740,784, mailed on Mar. 5, 2025, 115 pages.
Office Action in U.S. Appl. No. 18/740,810, mailed on Dec. 27, 2024, 87 pages.
Office Action in U.S. Appl. No. 18/740,810, mailed on May 7, 2025, 22 pages.
Office Action in U.S. Appl. No. 18/753,023, mailed on Aug. 5, 2025, 41 pages.

* cited by examiner

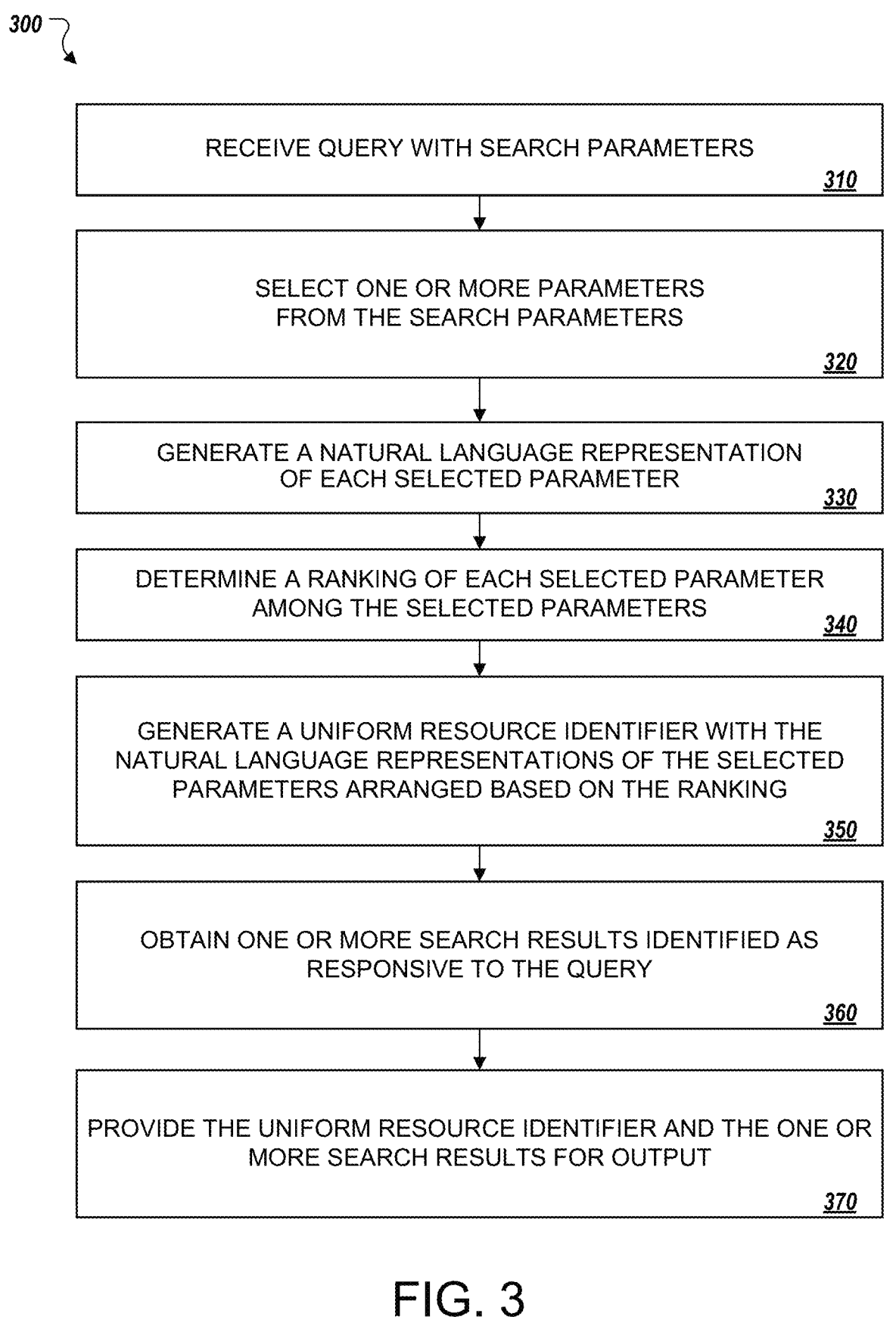

300

RECEIVE QUERY WITH SEARCH PARAMETERS 310

SELECT ONE OR MORE PARAMETERS FROM THE SEARCH PARAMETERS 320

GENERATE A NATURAL LANGUAGE REPRESENTATION OF EACH SELECTED PARAMETER 330

DETERMINE A RANKING OF EACH SELECTED PARAMETER AMONG THE SELECTED PARAMETERS 340

GENERATE A UNIFORM RESOURCE IDENTIFIER WITH THE NATURAL LANGUAGE REPRESENTATIONS OF THE SELECTED PARAMETERS ARRANGED BASED ON THE RANKING 350

OBTAIN ONE OR MORE SEARCH RESULTS IDENTIFIED AS RESPONSIVE TO THE QUERY 360

PROVIDE THE UNIFORM RESOURCE IDENTIFIER AND THE ONE OR MORE SEARCH RESULTS FOR OUTPUT 370

FIG. 3

UNIFORM RESOURCE IDENTIFIER ENCODING

CROSS-REFERENCE TO RELATED APPLICATIONS

This application is a continuation of U.S. application Ser. No. 17/087,919, filed Nov. 3, 2020, which is a continuation of U.S. application Ser. No. 16/110,063, filed Aug. 23, 2018, now U.S. Pat. No. 10,846,354, issued Nov. 24, 2020, which is a continuation of U.S. application Ser. No. 15/042,895, filed Feb. 12, 2016, now U.S. Pat. No. 10,083,244, issued Sep. 25, 2018. The complete disclosures of all of the above patent applications are hereby incorporated by reference in their entirety for all purposes.

FIELD

The present specification generally relates to natural language processing.

BACKGROUND

It is increasingly popular for users who obtain search results to want to share those search results with other users, or to save those search results for future use. For example, users are able to search for entities using various search parameters or search filters. The users obtain search results that are based on the various search parameters or that satisfy the various search filters.

SUMMARY

To facilitate searching, sharing a search with others, and tracking a particular search query, a uniform resource identifier (URI), such as a uniform resource locator (URL), may be constructed to include natural language text related to search parameters, but which is also compact and both shareable and useable beyond the initial user search experience. For example, a URI may be constructed that includes text associated with search criterion of the search query and the URI may be stored in association with the search query. The URI may be shared with another user or entered at another time in the future and results may be identified based on the same search criterion of the search query.

In general, an aspect of the subject matter described in this specification may involve a process by which a URI is generated using reverse natural language processing to generate a natural language representation for each search parameter in a received query. The natural language representation for each search parameter may be arranged in an order in the URI based on a ranking of each search parameter, and one or more search results identified as responsive to the query may be obtained and provided along with the generated URI for output. Accordingly, a user may more easily and more efficiently conduct and share a search based on search parameters encoded in the URI. This process has wide applicability, for example, to searches for products, businesses, services, real estate such as commercial properties and residential properties both for sale and for rent, other places of interest, other location-based data, and the like, or any combination thereof.

One innovative aspect of the subject matter described in this specification is embodied in methods that include the actions of receiving a query comprising search parameters, and selecting one or more of the search parameters. The actions further include, for each of the selected parameters: generating a natural language representation of the selected parameter; and determining a rank of the selected parameter among the one or more selected parameters. The actions further include generating a uniform resource identifier comprising the natural language representations of the selected parameters arranged in an order based on the ranks, obtaining one or more search results identified as responsive to the query, and providing the uniform resource identifier and the one or more search results for output.

These and other implementations may each optionally include one or more of the following features. For instance, another aspect of the subject matter described in this specification may be embodied in methods that include the actions of selecting one or more of the search parameters as encoded parameters, generating a session identifier as a representation of the encoded parameters, and associating the encoded parameters with the session identifier in one or more storage devices.

Another aspect of the subject matter described in this specification may be embodied in methods that include the actions of associating the session identifier with one or more of: a user identifier, a location, and a time of search, wherein the encoded parameters comprise coordinates of a map.

In some implementations, the actions may further include obtaining a particular uniform resource identifier comprising natural language representations of search parameters, and identifying search parameters for the query based on the particular uniform resource identifier.

Another aspect of the subject matter described in this specification may be embodied in methods that include the actions of obtaining one or more additional search results identified as responsive to the query; and providing the one or more additional search results for output.

In some implementations, the one or more search parameters are selected based on a predetermined selection rule, and the rank of each selected parameter is determined in accordance with a predetermined priority rule. In certain embodiments, no search results may be identified as responsive to the query, and the generated URI may be provided for output with zero search results or with an indication that there are no search results identified as responsive to the query.

Another aspect of the subject matter described in this specification may be embodied in methods that include the actions of obtaining a changed uniform resource identifier comprising at least one natural language representation of a search parameter different than the natural language representations of the selected parameters of the uniform resource identifier, identifying new search parameters for a changed query based on the changed uniform resource identifier, and obtaining one or more different search results identified as responsive to the changed query.

Other implementations of these and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations are set forth in the accompanying drawings and the description below. Other features and advantages will become apparent from the description, the drawings, and the claims.

BRIEF DESCRIPTION OF THE DRAWINGS

FIG. 3 depicts a flowchart of an example process for generating a uniform resource identifier with natural language representations of selected search parameters from a query, and providing the uniform resource identifier along with search results identified as responsive to the query, according to one example implementation.

Like reference numbers and designations in the various drawings indicate like elements.

DETAILED DESCRIPTION

Figure 1:
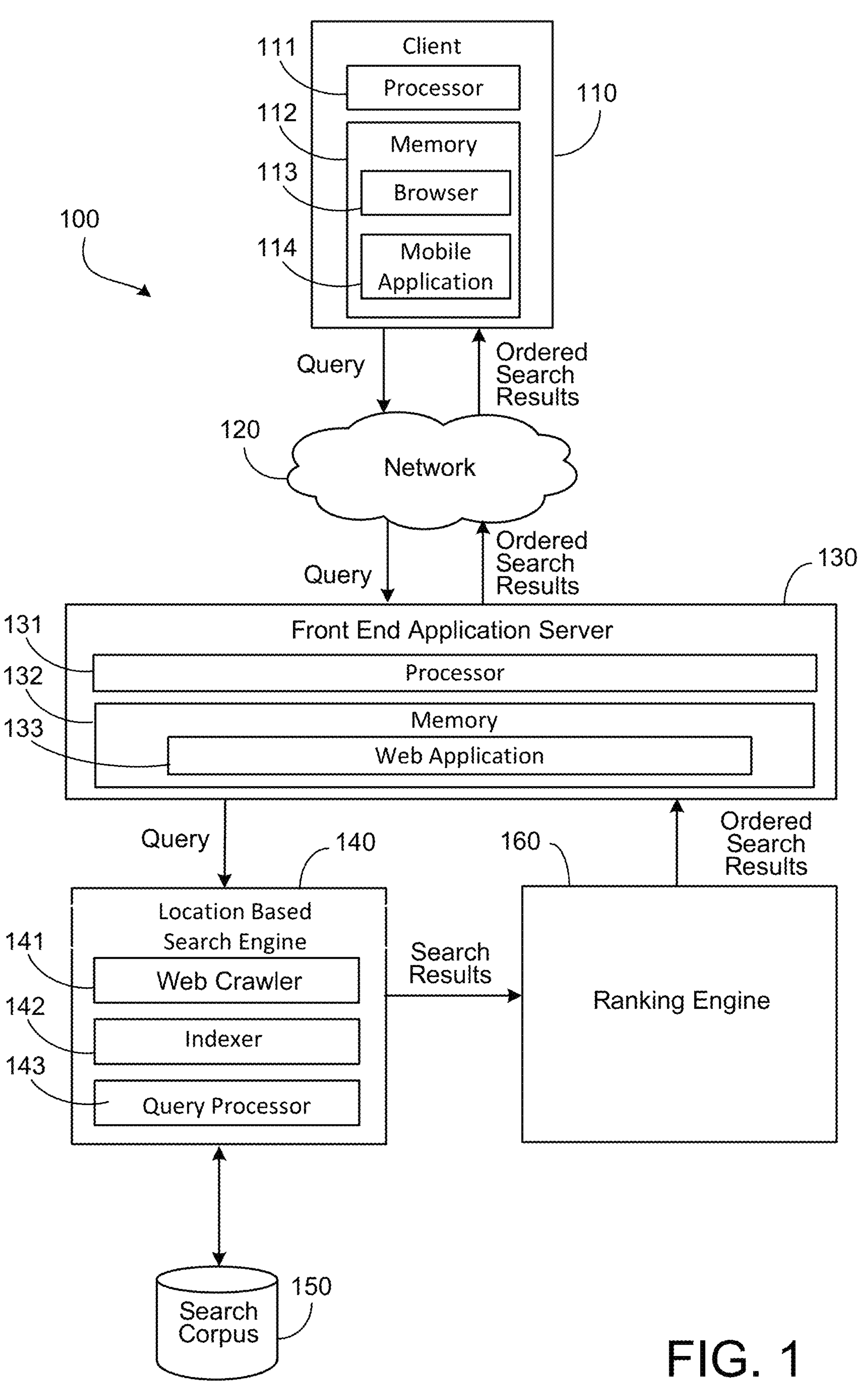
FIG. 1 depicts an example search engine system, according to one example implementation.

FIG. 1 depicts an example search engine system 100, according to one example implementation. The system 100 may include a client device 110, a network 120, a front-end application server 130, a location based search engine 140, a search corpus database 150, and a ranking engine 160.

Client device 110 may be representative of one, or multiple, client devices. The client device 110 may include a mobile computing platform or a non-mobile computing platform. Mobile computing platforms may include, for example, a smartphone, tablet, laptop computer, or other thin client devices. Non-mobile computing platforms may include, for example, desktop computers, set top box entertainment systems, video game consoles, or the like. Client device 110 may be configured to communicate with front-end application server 130 via network 120 using one or more communication protocols.

The client device 110 of system 100 may include at least a processor 111 and a memory 112. The memory 112 may provide for the storage of computer program code associated with one or more applications installed on client 110. The applications may include, for example, a browser 113 or mobile application 114. Processor 111 may be configured to execute the stored computer program code in a manner that allows client 110 to realize the functionality provided by the applications. Processor 111 may also be configured to execute instructions to realize the functionality associated with any of the actions attributed to client 110 below.

The client 110 may be able to access one or more web based applications 133 hosted by front-end application server 130 via network 120 using browser 113. Such web based applications may include, for example, an application that facilitates identification of one or more particular entities that may be available for sale, for lease, or that provide a particular service. An entity may include any item that may be available for sale or lease such as, for example, a book, a clothing item, a motor vehicle, a consumer electronic item, a house, an apartment, or the like. Alternatively, an entity may include a party that provides a service such as, for example, a restaurant, a barber shop, a day care facility, a school, a doctor's office, a law office, a government agency, or the like. Web application 133 may utilize one or more back-end components in order to identify one or more particular entities based on search input parameters. In certain instances, web application 133 may utilize the methods set forth herein to identify a set of one or more entities that are responsive to a query.

Identification of entities may be achieved by using client device 110 to search one or more databases such as, for example, search corpus database 150 and then using one or more back-end components to identify and return ordered search results to client device 110. A user may initiate a search with client device 110 by interacting with one or more search fields provided by web application 133 via a browser 113. For instance, a user may provide an input into a search field that can be used as at least a portion of a search query. Then, the user may instruct the client device 110 to transmit the search query to front-end application server 130 via network 120. Alternatively, or in addition, a user may input a search query by drawing one or shapes around a location of interest on a map provided by a graphical user interface. Client device 110 may then generate a query to identify entities that may reside within geographic locations associated with the one or more shapes drawn by the user on the map provided by a graphical user interface, and transmit the query to front-end application server 130. The front-end application server 130 may then forward the query to one or more back-end data processing systems that may execute the search query. The backend system may identify a set of search results response to the search query, rank each search result in the set of search results, and then return the set of search results that are responsive to the received query to the front-end application server 130. The front-end application server 130 may then forward the search results back to client device 110.

The search results may be displayed on a graphical user interface associated with client device 110 in a variety of different ways that may assist a user in understanding and interpreting the search results. For instance, the search results may be displayed as a list of one or multiple entities, wherein each entity in the list is ordered according to a rank determined by one or more backend components of system 100 such as, for example, ranking engine 160. Alternatively, the search results may be displayed by plotting one or multiple graphical icons on a map of a geographical area that each correspond to a particular entity identified as a search result that is responsive to a received search query. The location of each graphical icon on the map may be indicative of the location of the corresponding entity. In certain instances, search results may be displayed as both a ranked list of entities in a first portion of the graphical user interface and as a plot of graphical icons on a map in a second portion of the graphical user interface. Other ways of displaying search results also fall within the scope of this specification.

Separate from browser 113, a client device 110 may also be able to use a mobile application 114 in order for a user of client device 110 to avail himself of the same, or similar, functionality that was described above as being provided by a web application 133 via browser 113. Mobile application 114 may include an executable software program that was previously downloaded from a mobile application provider. Mobile application 114 may be configured to relay commands input by a user such as, for example, search queries to the front-end application server 130. After receiving a search query from mobile application 114, the front-end application server 130 may request that one or more backend components execute the search query, rank the search results, and then return the ranked search results to mobile application 114, which may display the search results as a ranked list of entities, as plotted graphical icons on a map, or a combination thereof.

Network 120 may be configured to facilitate connectivity between a client device 110 and the front-end application server 130. Client 110 and front-end application server 130 may be connected to network 120 via one or more wired, or wireless, communication links. Network 120 may include any combination of one or more types of public and/or private networks including but not limited to a local area network (LAN), wide area network (WAN), the Internet, a cellular data network, or any combination thereof.

Front-end application server 130 may include at least a processor 131 and a memory 132. The memory 132 may provide for the storage of computer program code associated with one or more applications hosted by front-end application server 130. The applications may include, for example, a web application 133 that may facilitate identification of one or more particular entities that may be available for sale, for lease, or that provide a particular service. Processor 131 may be configured to execute the stored computer program code in a manner that allows front-end application server 130 to realize the functionality provided by the applications. Processor 131 may also be configured to execute instructions to realize the functionality associated with any of the actions attributed to front-end application server 130 below.

Front-end application server 130 may serve as an interface between the client 110 and the back-end components of system 100 that may include, for example, a location based search engine 140, search corpus database 150, and ranking engine 160. Front-end application server 130 may be comprised of one or more server computers. Front-end application server 130 may be configured to receive commands from a client device 110, and translate those commands, if necessary, into a format that is compatible with one or more back-end network components. Front-end application server 130 may also employ network security applications such as, for example, a firewall, user authentication, subscription verification, or the like in an effort to supervise access to one or more back-end network components, if necessary.

Front-end application server 130 may also facilitate session management for each browsing session initiated by each respective client device 110 that is currently using a browser 113, or mobile application 114, to avail itself of the services provided by the web application 133. For instance, front-end application server 130 may employ functionality to associate an identifier with each query received by the front-end application server 130 from a particular client 110. The front-end application server 130 may later utilize the identifier in order to associate ordered search results received from a ranking engine 160 with a query received from a particular client 110. The identifier may then be used to return the set of ordered search results to the client device 110 that initiated the query. The identifier may include a user identifier, device identifier, transaction identifier, or the like System 100 may also include a location based search engine 140. Location based search engine 140 may be configured to receive and execute search queries that are associated with a location component. The location component of the search query may be based on a particular location that was input by a user via client device 110. The location component may be the location of the particular client device 110, or some other location that the user of client device 110 has input as an entity search parameter. Alternatively, the location component of the search query may be obtained by front-end application server 130, a back-end network component, or another network component associated with system 100 based on one or more attributes associated with a client device 110. For instance, one of the aforementioned network components may determine the current location of a client device 110. Alternatively, the current location of a client device 110 may be provided to one or more network components of system 100 by a third party. Alternatively, the location component may be determined based on locations that the client device 110 has recently traveled. The location component may include, for example, a neighborhood, a city, a state, a zip code, GPS coordinates, longitude and latitude coordinates, or the like.

Location based search engine 140 may include a web crawler 141, an indexer 142, and a query processor 143. The location based search engine 140 may be hosted by one or multiple server computers. The server computer(s) hosting the location based search engine 140 may be the same server computer(s) that provide the front-end application server 130. Alternatively, however, the server computer(s) hosting the location based search engine 140 may be a different set of one or more server computer(s) that are configured to communicate with the front-end application server 130 via one or more public or private networks.

Web crawler 141 may be configured to traverse computers connected to a computer network such as, for example, the Internet, to scan and identify data associated with particular entities. For instance, web crawler 141 may scan computers associated with a computer network in order to identify web pages, or other files accessible via the computer network, that may include data associated with one or multiple entities that are currently being offered for sale or lease. Alternatively, or in addition, web crawler 141 may scan computers associated with a computer network in order to identify web pages, or other files accessible via the computer network, that may include data associated with one or multiple entities that are currently offering a particular service. The identified web pages, or a subset of the raw data associated therewith, may be stored in search corpus database 150. In some implementations, web crawler 141 may be autonomous software that is configured to periodically scan computer networks in order to identify new, or previously undiscovered, web pages or other network accessible files associated with entities that are currently being offered for sale, for lease, or that may provide a service. Alternatively, or in addition, the functionality of web crawler 141 may be performed by one or more operators of location based search engine 140. For instance, a group of one or more analysts may obtain raw data associated with an entity, and store the raw data in search corpus database 150. Alternatively, or in addition, it is contemplated that a party that offers an entity for sale, for lease, or that provides a service may also upload raw data associated with the entity to search corpus database 150.

The aggregated set of raw data stored in search corpus database 150 may comprise a wealth of data describing a wide spectrum of different entities. For instance, search corpus database 150 may include for each known entity, for example, the entity's name, the entity's location, a description of the entity, a value associated with the entity, or the like. The value for the entity may include, for example, the cost of an entity that is being offered for sale or for lease. Alternatively, however, the value for an entity may include, for example, an entity rating. For instance, for an entity that offers a service such as, for example, Bob's Diner, the entity rating may include a feedback score associated with Bob's Diner based on customer experience. Such entity ratings may also be associated with entities for sale or for lease. Other types of raw data associated with an entity may be obtained via the data crawling process and stored in search corpus database 150.

Indexer 142 may be configured to analyze the raw data obtained during the crawling process in order to make the raw data searchable. For instance, indexer 142 parse the raw data and extract one or more types of relevant data. For example, the indexer 142 may analyze the raw data to extract an entity's name, an entity's location, and a value associated with the entity. Indexer 142 may than associate the extracted data with one or more keywords. The associated keywords may be compared to aspects of received search queries in order to determine whether the extracted data associated with the keywords is responsive to the search query.

Query processor 143 may be configured to receive a search query from front-end application server 130 that originated at a client device 110. Query processor 143 may be configured to parse the received query, extract any relevant keyword(s) from the received query, and then execute the query against the index generated by indexer 142. Query processor 143 may alter the form of one or aspects of the received query. For instance, query processor 143 may alter one or more keywords in order to expand or narrow the scope of a received query, as necessary. Such alterations to keywords of a query may include, for example, utilizing a root expander, replacing one or more characters with a wildcard character, insertion of one or more Boolean operators between keywords, dynamically altering location information associated with the query, or the like. Query processor 143 may also translate one or more aspects of the received query in order to make the query compatible with the index that is associated with the search corpus database 150. Query processor 143 may then execute the query against the search corpus database 150. Execution of the search query against the search corpus 150 may yield a set of one or multiple search results. The search results may identify, for example, a group of one or multiple links that are associated with entities that are responsive to the query received from client 110. The search result links may reference a web page that includes information associated with the particular entity that corresponds to reach respective link. The information included in the web page may be drawn from search corpus database 150. The set of search results may be substantially unordered, or otherwise arranged in an order that is not based on entity value. The search results identified by the query processor 143 in response to the received search query may then be passed to the ranking engine 160. In some implementations, the current value metric for each entity associated with an identified search result may also be passed to ranking engine 160 by location based search engine 140. The location based search engine 140 may communicate with the ranking engine using one or more public or private networks.

System 100 may also include a ranking engine 160. Ranking engine 160 may be hosted by one or multiple server computers. The server computer(s) hosting the ranking engine 160 may be the same server computer(s) that provide the front application server 130. Alternatively, however, the server computer(s) hosting the location based ranking engine 160 may be a different set of one or more server computer(s) that are configured to communicate with the front-end application server 130 via one or more public or private networks.

Ranking engine 160 may be configured to perform a series of post processing operations on the set of identified search results. The post processing operations may determine a ranking score that may be associated with each result in the set of search results based on the analysis of a metric associated with each entity responsive to a query. Ranking engine 160 may then return the set of ordered results to the front-end application server 130 via one or more public or private networks. Front-end application server may then provide the ordered search results to client device 110 via network 120.

Ranking engine 160 may be configured to isolate and analyze search results based on a predetermined geographic region. A geographic region may include, for example, a neighborhood, a city, a state, a zip code, GPS coordinates, longitude and latitude coordinates, a shape drawn by a user on a graphical user interface map, or the like. Once a set of set search results are isolated by geographic region, the ranking engine may analyze the entities associated with each search result. Ranking engine 160 may assign a score to a search result associated with a particular entity.

In some aspects of the present disclosure, ranking engine 160 may be utilized only when requested by a user of client device 110. If a user decides to not use ranking engine 160, the search results may be provided to the client device in the order determined by location search engine 140. Such order may be, for example, based on most expensive price, lowest price, based on an analysis of keyword frequency in a web page associated with the search result corresponding to the entity, based on payments received to increase a ranking score associated with each entity, or the like, or any combination thereof. Accordingly, client 110 may be able to toggle ranking engine 160 on and off.

Figure 2A:
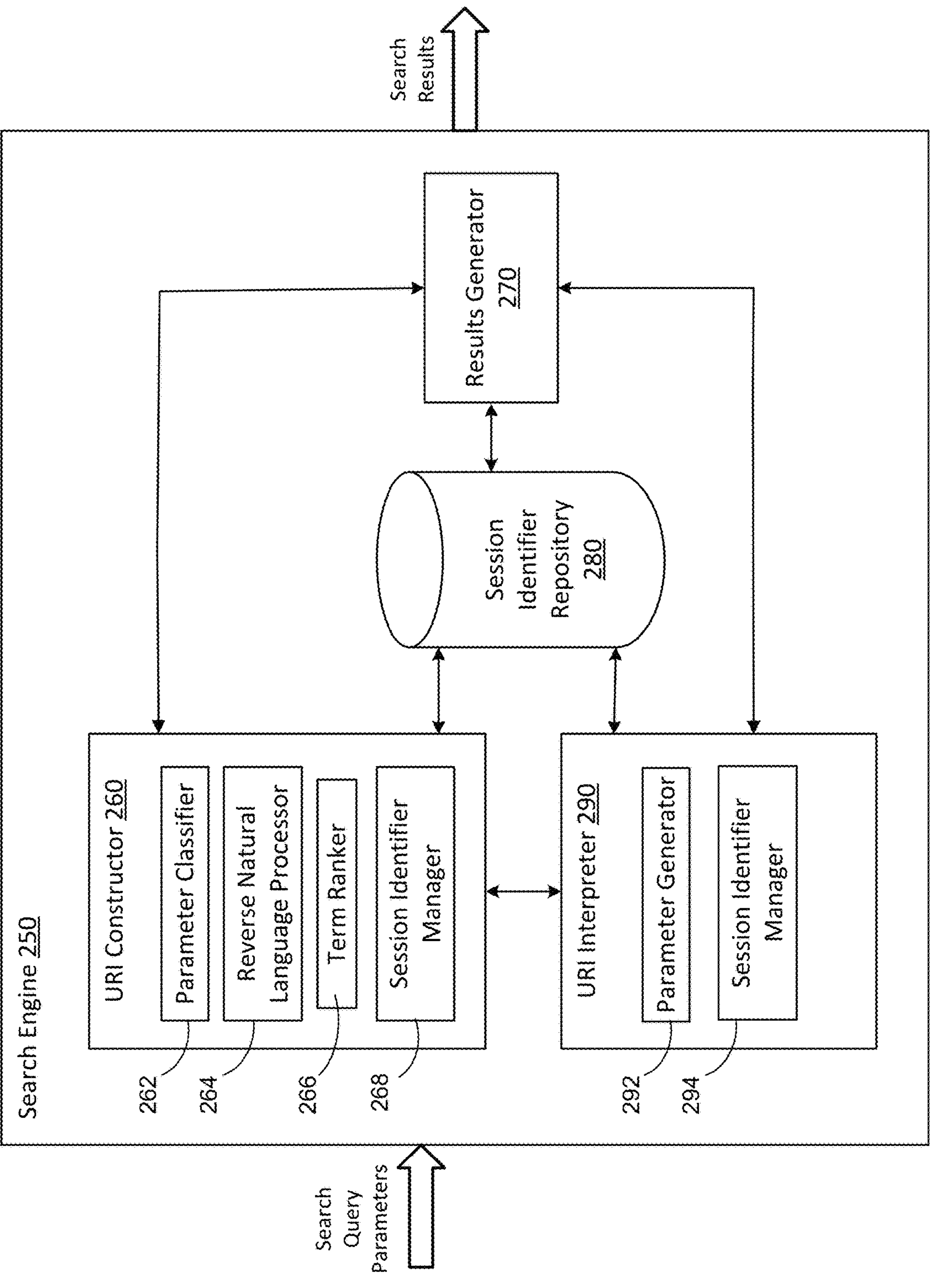
FIG. 2A depicts an exemplary search engine, according to one example implementation.

FIG. 2A depicts an exemplary search engine 250, according to one example implementation. Search engine 250 may include a uniform resource identifier (URI) constructor 260, a URI interpreter 290, a session identifier repository 280, and a results generator 270. The search engine 250 may receive search query parameters and provide search results identified as responsive to the search query as output.

The URI constructor 260 may include a parameter classifier 262, a reverse natural language processor 264, a term ranker 266, and a session identifier manager 268. In certain implementations, one or more of those components of the URI constructor 260 may be excluded.

The parameter classifier 262 may process the received search query to identify search parameters of the search query. In addition, the parameter classifier 262 may separate the identified search parameters according to the type of parameter. For example, one search parameter may be classified as related to price and another search parameter may be classified as related to location. Any of a number of different types of search parameters may be identified. The parameter classifier 262 may identify and classify search parameters based on predetermined rules that comprise a classifying policy. Thus, the parameter classifier 262 may select one or more search parameters identified from the search query.

The reverse natural language processor 264 may process the search parameters identified by the parameter classifier 262 to generate a natural language representation for each search parameter. The natural language representation of each parameter may be human readable and may include characters, numbers, words, abbreviations, or the like, or any combination thereof. The reverse natural language processor 264 may transform data associated with each search parameter identified from the query into a respective natural language representation of the search parameter. The reverse natural language processor 264 may generate more than one term or string of characters for each search parameter as the natural language representation. For example, for a particular location search parameter, the reverse natural language processor 264 may generate text corresponding to a city name and a state name as the natural language representation of the location parameter. The reverse natural language processor 264 may insert a particular character or characters between each string of characters, e.g., between the city and the state for the example location parameter. Thus, the reverse natural language processor 264 may generate a natural language representation for each search parameter in the URI such that a reading of the URI enables certain search parameters of the query to be discerned.

The term ranker 266 may determine a rank for the natural language representations of each search parameter. The term ranker 266 may determine an order that the natural language representations of each search parameter are to be arranged in the URI based on the determined ranks. For example, the term ranker 266 may determine a ranking score for the natural language representations of each search parameter, and determine the ranks based on the ranking scores. The ranking score may be calculated based on predetermined preferences, predetermined rules, a predetermined ranking policy, or the like, or any combination thereof. The term ranker 266 may, for example, determine the ranking of parameters according to predetermined preferences, such as most searched, importance to users, relevance of each parameter, language rules (e.g., ordered for readability), search history, logic rules, or the like, or any combination thereof. For example, the term ranker 266 may determine a rank for the natural language representations of each search parameter according to an importance of each search parameter to users of the search engine 250. In certain implementations, rules for determining a rank, such as the importance of each search parameter, may be customized for each user. In certain implementations, the term ranker 266 may rank the natural language representations of the search parameters in a manner for search engine optimization.

In certain implementations, the term ranker 266 may determine the order that the natural language representations of each search parameter are to be arranged in the URI based on the type of search parameter, such that certain types of search parameters are arranged before other types of search parameters in the URI. The term ranker 266 may segment the URI, with each segment relating to a particular type of parameter or a particular priority of parameters. For example, the term ranker 266 may determine the segmentation according to importance to users of the parameters, with highest importance parameters in one segment, and lower importance parameters in another segment. The URI may have any of a number of one or more segments. The term ranker 266 may separate the segments with a particular character or characters and may separate each natural language representation of a search parameter with a certain character or characters.

The session identifier manager 268 may select one or more parameters for which a natural language representation is not to be included in the URI. The session identifier manager 268 may encode those parameters by generating a session identifier as a representation of the encoded parameters. For example, the session identifier manager 268 may generate a string of characters as the session identifier for one or more encoded parameters. The session identifier manager 268 may further associate the encoded parameters with the session identifier in one or more storage devices. For example, the session identifier manager 268 may store the session identifier associated with search parameters in a database, such as the session identifier repository 280. The session identifier repository 280 may include on or more storage devices that may store multiple session identifiers associated with multiple searches. Thus, the session identifier manager 268 may ensure that each session identifier that is generated is different than the session identifiers that are already in use or in storage in the session identifier repository 280. The session identifier manager 268 may append the generated session identifier to the URI, for example, after the natural language representations of search parameters. The session identifier manager 268 may also associate, in the session identifier repository 280, the session identifier with other data, such as a user identifier, a location, a time of search, coordinates of a map, the query, a search history, or the like, or any combination thereof.

The results generator 270 may obtain search results identified as responsive to the search query. For example, the results generator 270 may obtain results identified as responsive to the search query based on the search parameters of the search query. The results generator 270 may identify search results in accordance with the process described above with reference to FIG. 1. The results generator 270 may provide one or more search results identified as responsive to the search query for output. For example, the results generator 270 may output the search results for display, sending, storage, or the like, or any combination thereof. In addition, the URI constructor 260 or the results generator 270 may provide the URI for output, for example, for display, sending, storage, or the like, or any combination thereof. In certain embodiments, no search results may be identified as responsive to the query, and the generated URI may be provided for output with zero search results or with an indication that there are no search results identified as responsive to the query.

The URI interpreter 290 may receive a URI that contains natural language representations of search parameters. The parameter generator 292 may process the URI and identify one or more search parameters for a query from the received URI. For example, the parameter generator may identify search parameters based on the natural language representations of the search parameters in the URI. In addition, the session identifier manager 294 may determine a session identifier included in the URI or associated with the URI. The session identifier manager 294 may use the determined session identifier to retrieve information from the session identifier repository 280. For example, session identifier manager 294 may retrieve encoded search parameters associated with the determined session identifier in the session identifier repository 280. The search parameters identified by the URI interpreter 290 may be communicated with the URI constructor. The search parameters identified by the URI interpreter 290 may be used to conduct a search by identifying entities responsive to a query based on the identified search parameters. Similar to the description above, the results generator 270 may provide one or more search results identified as responsive to the search query for output.

Figure 2B:
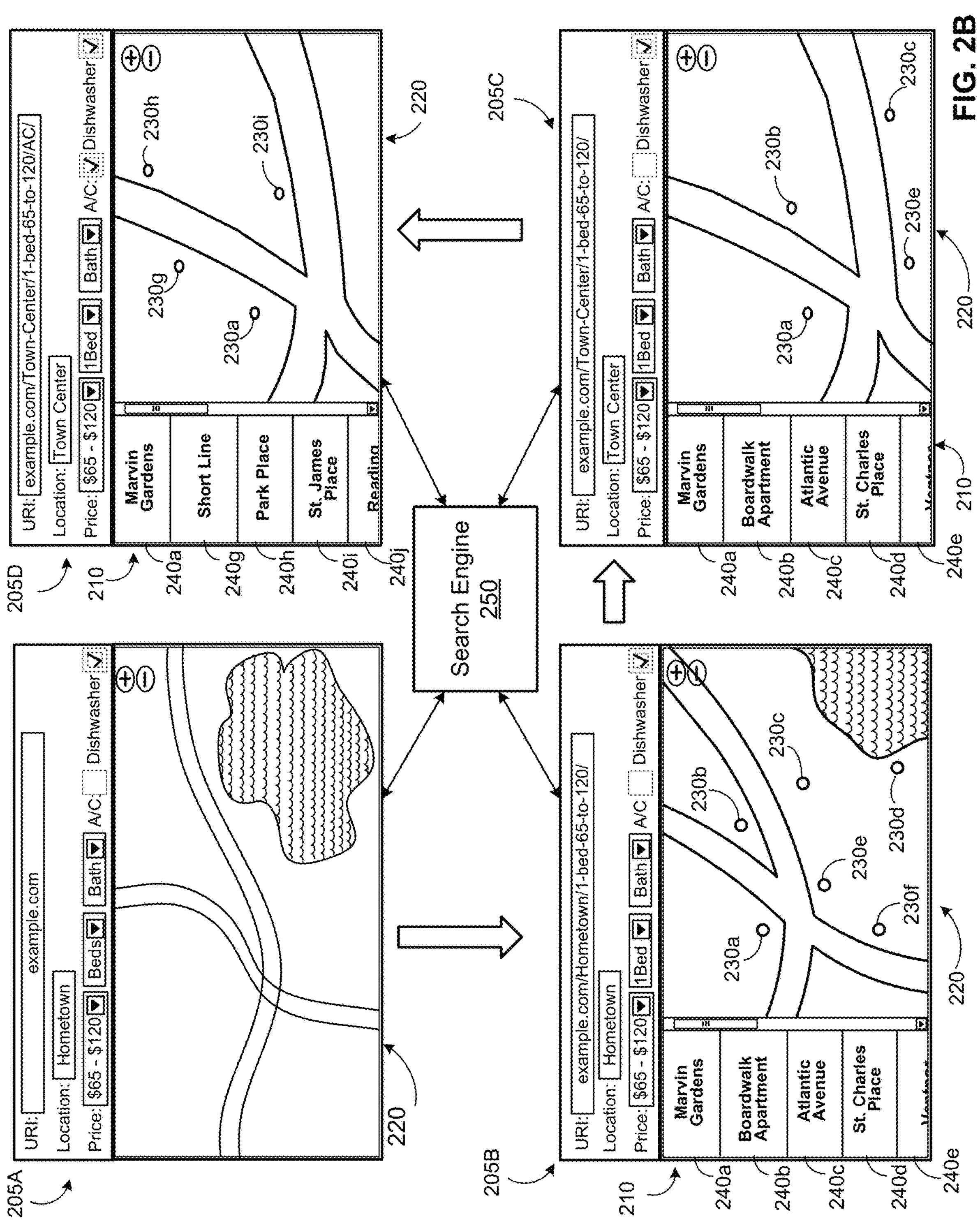
FIGS. 2B and 2C depict exemplary graphical user interfaces displaying search results and a uniform resource identifier with the search engine, according to one example implementation.

FIG. 2B depicts exemplary graphical user interfaces 205A-D displaying search results and a uniform resource identifier with the search engine 250 described above with reference to FIG. 2A, according to one example implementation. Each of graphical user interfaces 205A-D may represent, for example, a webpage or an application. Each of graphical user interfaces 205A-D may be accessed through an application, such as a browser or other application running on a personal or mobile computing device, and may represent a page or screen provided in association with a search engine.

Graphical user interface 205A may include a map portion 220 for displaying a rendering of a map. Graphical user interface 205A may correspond to a search page or a home page for a user to enter various search parameters, or adjust the map portion 220, or both. The upper portion of graphical user interface 205A may include a URI field, and entry fields for one or more search parameters. In the example depicted in FIG. 2B, graphical user interface 205A includes search parameters related to a property search, such as location, price, number of beds, number of baths, air conditioning (A/C), and dishwasher. The search parameters may be entered in an entry field, like the location in graphical user interface 205A; a drop-down list, like the price, number of beds, and number of baths in graphical user interface 205A; or a selection box, checkbox or the like, as in the A/C and dishwasher options in graphical user interface 205A. Once the search parameters have been entered, the search process may be initiated, including generation of the URI.

In the example depicted in FIG. 2B, the location is inputted as "Hometown," the price is inputted as a price range of "$65-$120," the number of beds is inputted as "1 Bed," the number of baths is not inputted, and the checkbox for dishwasher is selected. Graphical user interface 205B may correspond to a search results display. The graphical user interface 205B may include a list portion 210 that displays list-based representations 240*a-e* of entities that are identified as responsive to an inputted query. The list portion 210 may also include a scrollbar to enable scrolling in a list when there are more items in the list than may be viewed at once. For example, in graphical user interface 205B, list portion 210 includes additional list-based representations not shown that become visible upon scrolling the list. The list-based representations 240*a-e* in the list portion 210 may include text, images, or a combination of text and images associated with entities identified as responsive to a query. Although list portion 210 is shown with list-based representations 240*a-e* arranged in a vertical manner with respect to one another, list-based representations 240*a-e* may alternatively be arranged in a horizontal manner.

The graphical user interface 205B may also include a map portion 220 that displays map-based representations 230*a-f* of entities that are identified as responsive to an inputted query. Any of map-based representations 230*a-f* may correspond to more than one entity identified as responsive to a query. For example, map-based representation 230*f* may correspond to multiple entities identified as responsive to a query. A map-based representation may correspond to more than one entity when, for example, multiple entities are located closely together in a cluster. In certain embodiments, each of the list-based representations in list portion 210, including those not shown in graphical user interface 205B, may have a corresponding map-based representation. The location of each map-based representation on the map portion 220 may be indicative of the location of the corresponding entity or entities. The zoom level of the map portion 220 may be adjusted, for example, by a user selecting a plus sign to zoom in and a minus sign to zoom out. The area displayed in the map portion 220 may be adjusted, for example, by selecting and moving the map in any direction.

The search parameters that were previously inputted may remain displayed on, for example, the upper portion of graphical user interface 205B. In addition, the URI generated and outputted by the URI constructor 260 may be displayed in a URI field. In the depicted example, the URI field of graphical user interface 205B displays the URI "example.com/Hometown/1-bed-65-to-120/" as the URI generated based on the search parameters. In particular, for the example website, "example.com," the displayed URI corresponds to natural language representations of the inputted location of "Hometown," the inputted number of beds as "1 Bed," and the inputted price range of "$65-$120." Thus, for example, for the location parameter, the URI includes the natural language representation of "Hometown/" and, for the number of beds parameter, the URI includes the natural language representation of "1-bed." In addition, for the price parameter, the URI includes the natural language representation of "65-to-120." Thus, from the URI itself, it is discernible that the search parameters for the search query included "Hometown" for location, "1 Bed" for number of beds, and "$65-$120" for price.

As described above, a ranking is determined for the search parameters and the natural language representations of the search parameters are arranged in the URI in an order according to the ranking. Thus, in the example depicted in FIG. 2B, the location parameter may be ranked higher than the number of beds and the price, and the number of beds may be ranked higher than the price. Thus, the natural language representation of "Hometown" for the location parameter is arranged before the natural language representation of "1-bed" for the number of beds parameter and before the natural language representation of "65-to-120" for the price parameter. In addition, although "dishwasher" is selected, the dishwasher parameter may be deemed less important to users or the ranking of the dishwasher parameter may satisfy a predetermined threshold that indicates a natural language representation for "dishwasher" is not to be included in the URI. As described above, the dishwasher parameter may be encoded by generating a session identifier as a representation of the dishwasher parameter and associating the session identifier with the dishwasher parameter.

The URI may be segmented according to the ranking or according to the type of parameter, or the like, into different natural language representation segments. A particular character or characters, for example the character "/" may separate each of the segments. For example, as depicted in the URI of graphical user interface 205B, the location parameter may be included in a first segment, and the number of beds and price parameters may be included in a second segment, with the first and second segments separated by "/". In addition, natural language representations may have a particular character or characters between them, for example, in place of spaces. Thus, for example, as depicted in the URI of graphical user interface 205B, the natural language representations for number of beds and price may have the character "-" between them, as in "1-bed-65-to-120."

In graphical user interface 205C, the map displayed in map portion 220 has been adjusted, for example, by zooming, which may be based on the location parameter input as "Town Center," or in response to a zoom input on the map portion 220. As a result, the map portion 220 displays map-based representations 230*a*, 230*b*, 230*c*, and 230*e*, but map-based representations 230*d* and 230*f* are no longer visible. Further, the URI displayed in the URI field has been changed to replace "Hometown" with "Town Center" as the natural language representation of the location parameter. The other depicted search parameters remain the same as in graphical user interface 205B. Thus, the URI generated for the given search parameters is displayed in the URI field as "example.com/Town-Center/1-bed-65-to-120/."

In graphical user interface 205D, the search parameters may be modified by selecting the A/C checkbox to designate air conditioning as a search parameter. In response, the search results may be updated and additional or different entities may be identified as responsive to the search query that includes the search parameter for air conditioning. Thus, as depicted in graphical user interface 205D, for example, new entities may be identified as responsive to the query and list-based representations 240*g-j* may be included in list portion 210, along with list-based representation 240*a* that was previously displayed. In addition, map-based representations 230*g-i* may be displayed in map portion 220, along with map-based representation 230*a* that was previously displayed.

Further, the URI generated for display in graphical user interface 205D may include natural language representations that reflect the search parameters. For example, the selection of the A/C checkbox designates air conditioning as a search parameter and a natural language representation of "AC" may be included in the URI. The ranking of the air conditioning parameter may indicate that the natural language representation of "AC" is arranged after the location, number of beds, and price. For example, air conditioning may be determined to be a less important search parameter or have a lower priority to users than location, number of beds, and price. In the example depicted in FIG. 2B, the URI displayed in the URI field of graphical user interface 205D includes the natural language representation of "AC" in a third segment, after the first segment that includes the natural language representation of the location parameter, and the second segment that includes the natural language representations of the number of bedrooms and the price. The URI generated and displayed in each of the graphical user interfaces depicted in FIG. 2B may be saved for later or shared with other users to identify entities responsive to the search query associated with the URI, as described in more detail with respect to FIG. 2C.

Figure 2C:
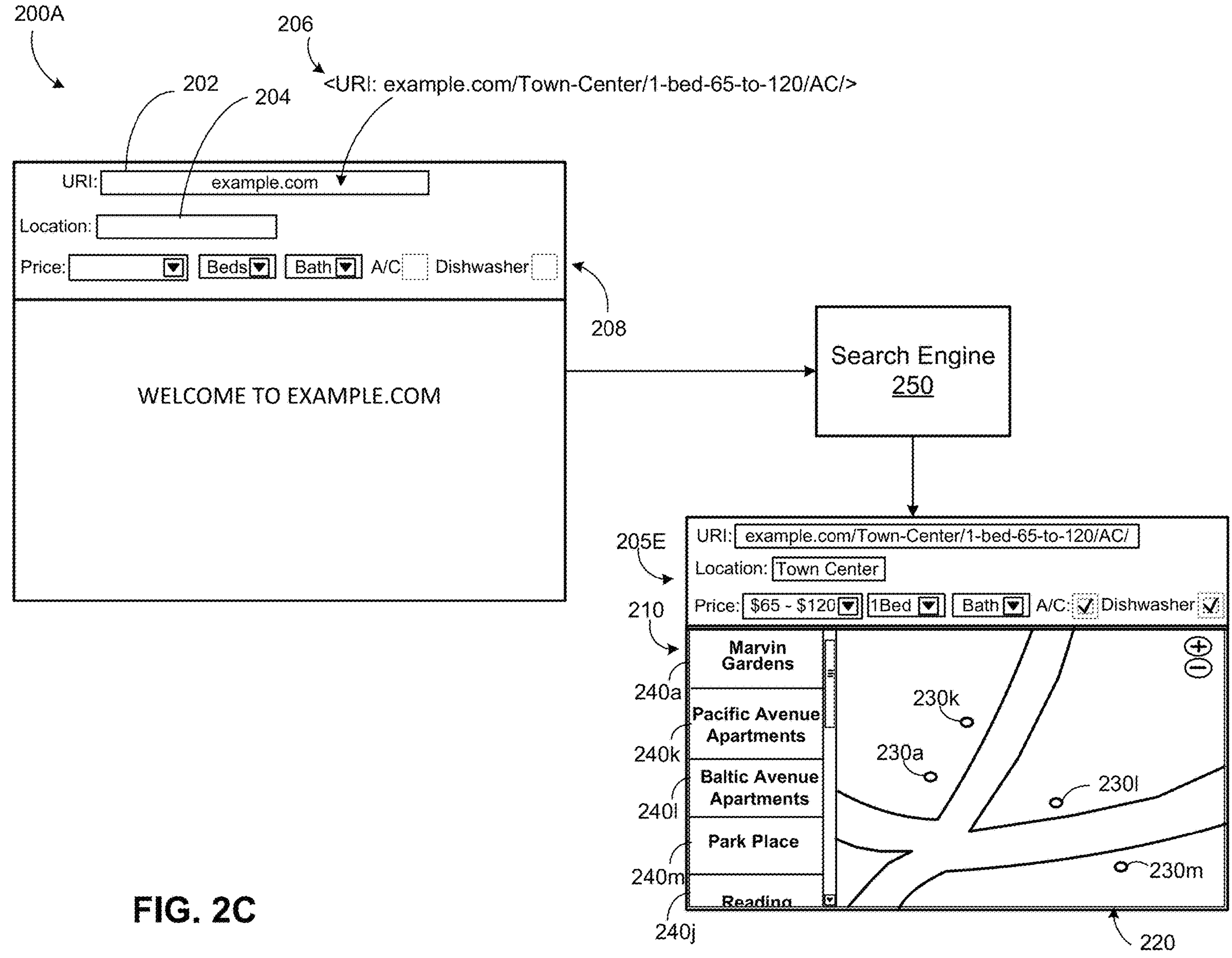

FIG. 2C depicts exemplary graphical user interfaces 200A and 205E displaying search results and a uniform resource identifier with the search engine 250, according to one example implementation. Graphical user interface 200A may correspond to a search page or a home page for a user to enter various search parameters. For example, the upper portion of graphical user interface 200A may include a URI field 202, and entry fields 204 and 208 for one or more search parameters. As depicted, the bottom portion of graphical user interface 200A may correspond to a welcome screen or home page of a web page or application, such as "example.com." The graphical user interface 200A may include an entry field 204 for location and one or more additional selections 208 for search parameters, for example, as drop-down menus, checkboxes, or the like, or any combination thereof. A user may enter a URI 206, including natural language representations of search parameters, that was previously generated, and saved for later or shared, into the URI field 202. For example, the URI 206 generated and displayed in graphical user interface 205D of FIG. 2B of "example.com/Town-Center/1-bed-65-to-120/AC/" may be entered in URI field 202.

As described with reference to FIG. 2A, search engine 250 may receive the URI 206 that includes natural language representations of search parameters, identify the search parameters from the URI, and obtain search results of entities identified as responsive to a query based on the identified search parameters. Similar to graphical user interfaces 205B-D, graphical user interface 205E may correspond to a search results display. The graphical user interface 205E may include a list portion 210 that displays list-based representations 240*a*, 240*k*, 240*l*, 240*m*, and 240*j* of entities that are identified as responsive to the query. The graphical user interface 205E may also include a map portion 220 that displays map-based representations 230*a*, 230*k*, 230*l*, and 230*m* of entities that are identified as responsive to the query.

Because time may have passed from when the URI 206 was generated to when the URI 206 is input into URI field 202, for example, if URI 206 is saved for later or shared, additional or different entities may be identified as responsive to the query based on the search parameters identified from the URI 206. In other words, the search parameters for graphical user interface 205D and the search parameters for the graphical user interface 205E are the same, and they have the same URI, but the entities identified as responsive to the query based on the search parameters may be different. For example, as depicted in FIG. 2C, graphical user interface 205E displays list-based representations 240*k-m* and map-based representations 230*k-m* for entities that are different than list-based representations 240*g-i* and map-based representations 230*g-i* for entities that are displayed in graphical user interface 205D.

Thus, for example, a first user may enter search parameters and a URI may be generated along with search results. Then, the first user may share the generated URI with a second user and the second user may input the generated URI into URI field 202 at a later time. The entities identified as responsive to the query based on the search parameters may be updated and different or additional entities may be provided to the second user than were provided to the first user because the different or additional entities are responsive to the query when the second user enters the URI and those entities may not have been responsive to the query when the first user searched. In certain implementations, the graphical user interface may display the same entities to the second user as were displayed to the first user. In certain implementations, the graphical user interface may display an indication of which entities are different or additional entities, or which entities are no longer responsive to the query, or the like, or any combination thereof. While examples are described with reference to the English language, any language could be used, as is apparent to one of ordinary skill in the art.

FIG. 3 depicts a flowchart of an example process 300 for generating a uniform resource identifier with natural language representations of selected search parameters from a query, and providing the uniform resource identifier along with search results identified as responsive to the query, according to one example implementation. The process may be performed by components of systems described with reference to FIGS. 1 and 4.

The process 300 may include receiving a query comprising search parameters at 310. The query may be inputted by a user searching for results responsive to the query. The query may include, for example, text, hypertext, search-directives, Boolean operators, selected options, filters, ranges, thresholds, or the like, or any combination thereof. The process may further include, at 320, selecting one or more of the search parameters included in the query. The search parameters may be identified from data associated with the query.

For each of the parameters selected at 320, a natural language representation of the selected parameter may be generated at 330. The natural language representation of the selected parameter may be human readable and may include words, numbers, abbreviations, or other text, or any combination thereof. Thus, data associated with one or more selected search parameters may be transformed into natural language representations of the parameters that may be readable and comprehensible.

At 340, a rank of each of the selected parameters, among the one or more selected parameters, may be determined. The selected parameters may be ranked according to predetermined criteria. For example, the ranking of parameters may be determined according to predetermined preferences, such as most searched, importance to users, relevance of each parameter, language rules (e.g., ordered for readability), search history, logic rules, or the like, or any combination thereof. In certain implementations, the predetermined preferences may be customized for each user. A ranking score may be determined for each of the selected parameters to determine a ranking order. The ranking score may be calculated based on the above predetermined preferences, as well as any of a number of signals, including semantic signals, temporal signals, linguistic indicators, associated metadata, or the like, or any combination thereof.

In certain implementations, the one or more search parameters may be selected at 320 based on a predetermined selection rule, and the rank of each selected parameter may be determined in accordance with a predetermined priority rule at 340.

The process 300 may include generating a URI, at 350, that includes the natural language representations of the selected parameters arranged in order based on the ranks of the selected parameters determined at 340. The URI may be generated, parameter by parameter, in the order that is readable for display. In certain embodiments, the order for the natural language representations of one or more of the selected parameters in the URI may be the same for every URI that is generated.

The URI may be segmented, with each segment relating to a particular type of parameter or a particular priority of parameters. For example, the segmentation may be determined according to importance to users of the parameters, with highest importance parameters in one segment, and lower importance parameters in another segment. The URI may have any of a number of one or more segments. The segments may be separated by one or more characters. For example, each segment may be separated by a "/" in the URI. In a segment that includes more than one parameter, each parameter may be separated by one or more characters within the segment. For example, each parameter in the segment may be separated by a "-" in the URI. Thus, a URI may be generated that is readable and comprehensible, such that the search parameters of the query that have natural language representations in the URI may be identified by another user or device.

At 360, one or more search results identified as responsive to the query may be obtained. The one or more search results may be identified as responsive to the query based on the search parameters of the query. For example, the search results may be identified in accordance with the methods and structures described above with reference to FIGS. 1 and 2A. The process 300 may further include providing the URI generated at 350 and the one or more search results obtained at 360 for output at 370. For example, the URI and search results may be output for display, sending, storage, or the like, or any combination thereof. In certain embodiments, no search results may be identified as responsive to the query, and the generated URI may be provided for output with zero search results or with an indication that there are no search results identified as responsive to the query.

The process may also include selecting one or more of the search parameters as encoded parameters, generating a session identifier as a representation of the encoded parameters, and associating the encoded parameters with the session identifier in one or more storage devices. For example, one or more of the search parameters may not have a natural language representation generated, and instead, may be encoded and represented by a session identifier. The session identifier may be a string of characters and may be included as part of the generated URI. For example, a session identifier representation of encoded parameters may be included after the natural language representations of the selected parameters in the URI.

In certain implementations, the encoded parameters may be selected as the search parameters with lower priority, importance, relevance, or the like, than the selected parameters for which natural language representations are generated. The encoded parameters may be associated with the session identifier and stored, for example, in a database. The database may store, in association with the session identifier, data related to the search parameters including both selected and encoded parameters, the query, a user identifier, a location, the time of the search, a search history, coordinates of a map, or the like, or any combination thereof.

The process may further include obtaining a particular URI that includes natural language representations of search parameters, and identifying search parameters for a search query based on the particular URI that is obtained. For example, a user may enter a particular URI that includes natural language representations of search parameters, and a query may be generated based on the search parameters identified from the particular URI. In some implementations, the URI may also include a session identifier that is associated with encoded parameters, and the encoded parameters may be determined based on the session identifier. For example, the encoded parameters associated with the session identifier may be identified from a database that stores the session identifier in association with the encoded parameters.

In certain implementations, the process may include obtaining one or more additional search results identified as responsive to the query, and providing the one or more additional search results for output. For example, if time has elapsed from the time a search was first generated to a time that the particular URI generated for that search is re-entered, there may be additional results identified as responsive to the query that were not previously identified as responsive to the query. In particular, for example, a URI may be generated with natural language representations of certain search parameters of a received query for which a first set of search results has been identified as responsive to the query. That URI may be saved for later or shared. When that URI is entered at a future time, a query may be generated based on the search parameters identified from the URI, and a second set of search results may be identified as responsive to the query, where the second set of search results may include one or more additional search results that were not included in the first set of search results and the second set of search results may include some, all, or none of the first set of search results.

The process may include obtaining a changed URI that includes at least one natural language representation of a search parameter different than the natural language representations of the selected parameters of the URI. For example, a natural language representation of a search parameter may be modified or added to the natural language representations of the selected parameters in the URI to generate a changed URI. The process may further include identifying new search parameters for a changed query based on the changed URI, and obtaining one or more different search results identified as responsive to the changed query. Thus, for example, if a maximum price is one of the search parameters represented in the URI, the maximum price may be modified directly in the URI, and a changed query that includes the new maximum price search parameter may be identified, such that one or more search results may be obtained that are identified as responsive to the query with the modified maximum price parameter.

Figure 4:
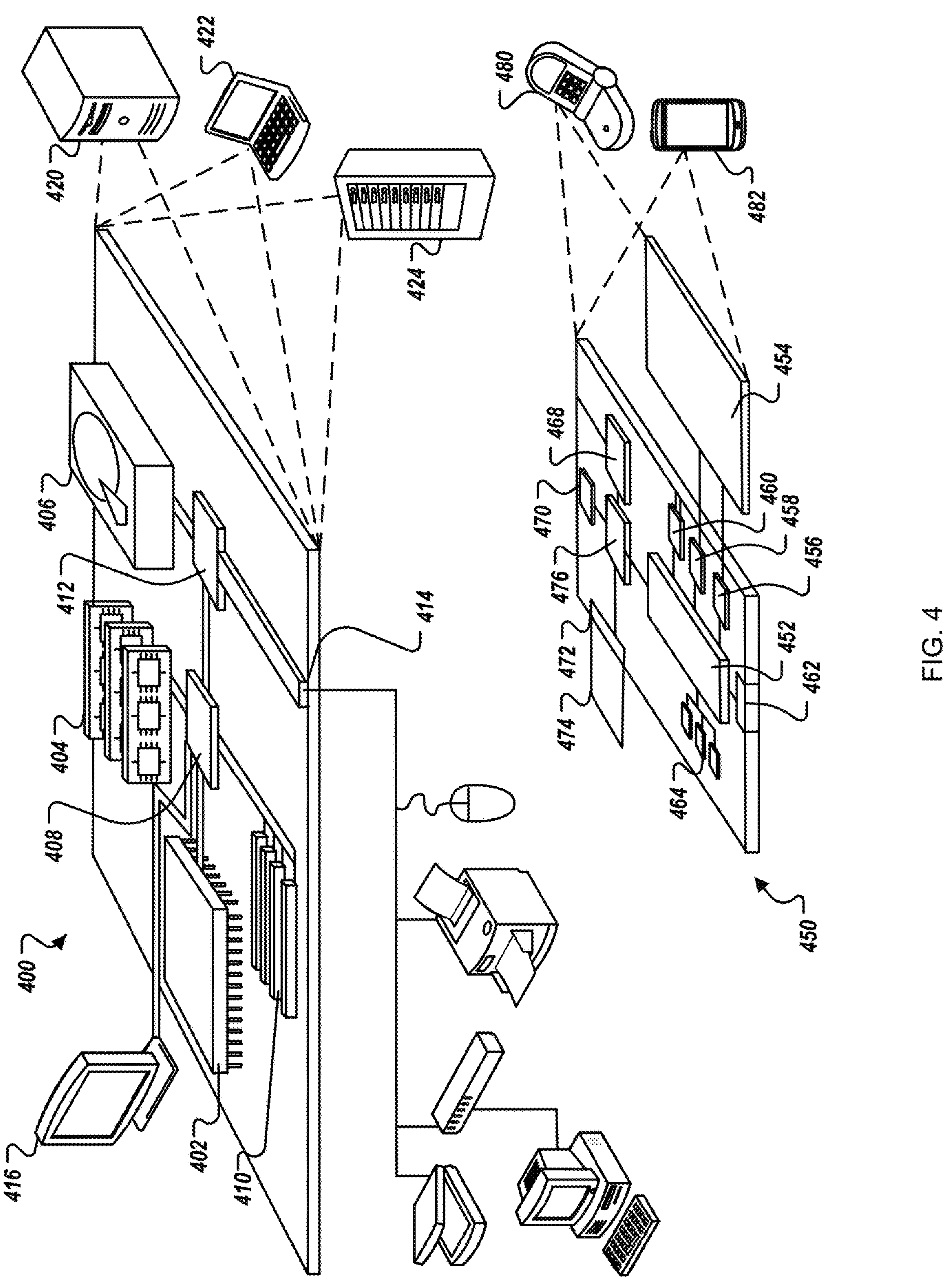
FIG. 4 depicts a computer device and a mobile computer device that may be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit the exemplary implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, or a memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 640, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 648 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 454 may also be provided and connected to device 450 through expansion interface 452, which may include, for example, a SIMM (Single In Line Memory Module) card interface. Such expansion memory 454 may provide extra storage space for device 450, or may also store applications or other information for device 450. Specifically, expansion memory 454 may include instructions to carry out or supplement the processes described above, and may include secure information also. Thus, for example, expansion memory 454 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 454, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 450 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Exemplary implementations and all of the functional operations described in this specification can be implemented in digital electronic circuitry, or in computer software, firmware, or hardware, including the structures disclosed in this specification and their structural equivalents, or in combinations of one or more of them. Exemplary implementations can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, exemplary implementations can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Exemplary implementations can be implemented in a computing system that includes a back-end component, e.g., as a data server, or that includes a middleware component, e.g., an application server, or that includes a front-end component, e.g., a client computer having a graphical user interface or a Web browser through which a user can interact, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising one or more computers and one or more storage devices storing instructions that are operable, when executed by the one or more computers, to cause the one or more computers to perform operations comprising:

receiving, by a uniform resource identifier interpreter of a search engine, a uniform resource identifier from a client device over a network, wherein the uniform resource identifier includes a path that includes one or more path segments that are natural language representations of one or more first search parameters that each indicate a criterion for selecting search results, and wherein the uniform resource identifier includes an additional representation of one or more other encoded parameters that (i) are not expressed as natural language representations in the uniform resource identifier and (ii) represent one or more second search parameters that each indicate a criterion for selecting search results, wherein the additional representation is not a natural language representation;

identifying, by the uniform resource identifier interpreter of the search engine, (i) the one or more first search parameters from the one or more path segments that are natural language representations and (ii) the one or more second search parameters using the additional representation of the one or more other encoded parameters that are not natural language representations in the uniform resource identifier;

performing, by a results generator of the search engine, a search by comparing records of a search index with the one or more first search parameters and the one or more second search parameters, wherein the records of the search index comprise keyword data derived from multiple sources over the network, and wherein the search identifies results based at least in part on the keyword data; and providing, by the search engine, a set of the results of the search over the network for display by the client device.

2. The system of claim 1, wherein the additional representation is a session identifier; and wherein identifying the one or more second search parameters comprises using the session identifier in the uniform resource identifier to obtain the one or more other encoded parameters that represent the one or more second search parameters that are not represented by natural language representations in the uniform resource identifier.

3. The system of claim 2, wherein the operations comprise storing, in a session identifier repository, multiple session identifiers corresponding to different search sessions; and wherein the session identifier repository indicates, for each of the multiple session identifiers, one or more encoded parameters from the search session that corresponds to the session identifier.

4. The system of claim 3, wherein the encoded parameters stored in the session identifier repository comprise values for at least one of a user identifier, a location, a time of search, coordinates of a map, a query, or a search history.

5. The system of claim 1, the operations further comprising:

displaying the uniform resource identifier;

receiving a user modification of a first natural language representation in the uniform resource identifier to generate a modified uniform resource identifier;

performing a modified search by the search engine using the modified uniform resource identifier as a search request; and displaying results of the modified search.

6. The system of claim 5, wherein:

the first natural language representation comprises one or more words that describe a respective search parameter and one or more filter values that are associated with the respective search parameter; and receiving a user modification of the first natural language representation comprises receiving a modification of at least one of the one or more filter values.

7. The system of claim 1, the operations further comprising formulating a search query based on the identified search parameters, wherein performing the search comprises executing the search query.

8. The system of claim 7, wherein executing the search query comprises:

identifying a set of search results response to the search query;

rank the search result in the set of search results; and returning the ranked set of search results.

9. The system of claim 1, wherein the uniform resource identifier was previously generated by the search engine during an earlier browsing session.

10. The system of claim 1, wherein the uniform resource identifier is a static uniform resource locator.

11. The system of claim 1, wherein the uniform resource identifier is not a dynamic URL.

12. The system of claim 1, wherein the path segments are separated by slashes.

13. The system of claim 1, wherein the additional representation of the one or more other encoded parameters comprises a session identifier;

wherein the operations include, before receiving the uniform resource identifier, storing, by the search engine, data that associates the session identifier with the one or more other encoded parameters; and wherein identifying the one or more second search parameters comprises identifying the one or more second search parameters based on the stored data that associates the session identifier with the one or more other encoded parameters.

14. The system of claim 1, wherein, in the path of the uniform resource identifier, boundaries of path segments are designated by slashes in the uniform resource identifier;

wherein the one or more other encoded parameters include a first encoded parameter, provided as a single path segment of the uniform resource identifier, that represents multiple different search criteria for selecting search results; and wherein identifying the second respective search parameters comprises identifying the multiple different search criteria based on the first encoded parameter.

15. The system of claim 1, wherein the one or more first search parameters and the one or more second search parameters are search parameters that were specified by interaction of a user with interactive controls on a user interface of a search engine web page provided by the search engine during a previous session of user interaction with the search engine, wherein the uniform resource identifier is generated by the search engine based on the search parameters specified by the interaction of the user with the interactive controls; and wherein the operations comprise, in response to the search engine receiving the uniform resource identifier, providing, by the search engine, content for a search web page having interactive controls configured with settings that cause the interactive controls to indicate the one or more first search parameters and the one or more second search parameters determined from the uniform resource identifier.

16. The system of claim 15, wherein the content for the search web page populates at least one of the interactive controls of the search web page to display a value that specifies the one or more first search parameters determined from the uniform resource identifier or the one or more second search parameters determined from the uniform resource identifier.

17. The system of claim 1, wherein providing the set of results of the search over the network for display by the client device comprises providing a list of search results identified by the results generator of the search engine in the search performed using the one or more first search parameters and the one or more second search parameters, wherein the search results in the list are ordered according to a ranking determined based on at least one metric or characteristic of the search results.

18. The system of claim 17, wherein the ranking of the search results in the list is based at least in part on a keyword frequency for one or more keywords associated with the search results.

19. The system of claim 17, wherein the search results represent entities located at different geographic locations, and wherein the ranking is based at least in part on values describing properties of the entities.

20. The system of claim 1, wherein providing the set of results of the search over the network for display by the client device comprises providing data indicating entities selected based on the one or more first search parameters and the one or more second search parameters, wherein the data comprises indications of geographical locations of the entities with respect to a map of a geographical area.

21. The system of claim 1, wherein performing the search comprises searching for entities located in a particular geographical region, and wherein the set of results of the search comprises entities located in the particular geographical region.

22. The system of claim 21, wherein the particular geographical region is a user-specified geographical region.

23. The system of claim 1, wherein the keyword data indicates keywords associated with different entities;

wherein performing the search comprises selecting entities based at least in part on the keyword data; and wherein providing the results of the search comprises indicating a set of the selected entities that were selected based on based at least in part on the keyword data.

24. The system of claim 21, wherein the search index indicates, for each of a plurality of entities, a name of the entity, a geographical location of the entity, and one or more values indicating a property of the entity; and wherein the entities in the set of selected entities are selected or ranked based at least in part on the names, the geographical locations, or the values indicated by the search index.

25. The system of claim 1, wherein the search index comprises information indexed from web pages obtained by a web crawler from the multiple sources over the Internet.

26. The system of claim 1, wherein the operations comprise, before performing the search:

using a web crawler to identify and obtain content from a plurality of servers over the network; and indexing the content using an indexer and storing the indexed content in the search index.

27. A computer-implemented method comprising:

receiving, by a uniform resource identifier interpreter of a search engine, a uniform resource identifier from a client device over a network, wherein the uniform resource identifier includes a path that includes one or more path segments that are natural language representations of one or more first search parameters that each indicate a criterion for selecting search results, and wherein the uniform resource identifier includes an additional representation of one or more other encoded parameters that (i) are not expressed as natural language representations in the uniform resource identifier and (ii) represent one or more second search parameters that each indicate a criterion for selecting search results, wherein the additional representation is not a natural language representation;

identifying, by the uniform resource identifier interpreter of the search engine, (i) the one or more first search parameters from the one or more path segments that are natural language representations and (ii) the one or more second search parameters using the additional representation of the one or more other encoded parameters that are not natural language representations in the uniform resource identifier;

performing, by a results generator of the search engine, a search by comparing records of a search index with the one or more first search parameters and the one or more second search parameters, wherein the records of the search index comprise keyword data derived from multiple sources over the network, and wherein the search identifies results based at least in part on the keyword data; and providing, by the search engine, a set of the results of the search over the network for display by the client device.

28. The method of claim 27, wherein the additional representation is a session identifier; and wherein identifying the one or more second search parameters comprises using the session identifier in the uniform resource identifier to obtain the one or more other encoded parameters that represent the one or more second search parameters that are not represented by natural language representations in the uniform resource identifier.

29. The method of claim 27, comprising:

displaying the uniform resource identifier;

receiving a user modification of a first natural language representation in the uniform resource identifier to generate a modified uniform resource identifier;

performing a modified search by the search engine using the modified uniform resource identifier as a search request; and displaying results of the modified search.

30. The method of claim 29, wherein:

the first natural language representation comprises one or more words that describe a respective search parameter and one or more filter values that are associated with the respective search parameter; and receiving a user modification of the first natural language representation comprises receiving a modification of at least one of the one or more filter values.

31. The method of claim 27, comprising formulating a search query based on the identified search parameters, wherein performing the search comprises executing the search query.

32. The method of claim 27, wherein the uniform resource identifier was previously generated by the search engine during an earlier browsing session.

33. One or more non-transitory storage devices storing instructions that are operable, when executed by one or more computers, cause the one or more computers to perform operations comprising:

receiving, by a uniform resource identifier interpreter of a search engine, a uniform resource identifier from a client device over a network, wherein the uniform resource identifier includes a path that includes one or more path segments that are natural language representations of one or more first search parameters that each indicate a criterion for selecting search results, and wherein the uniform resource identifier includes an additional representation of one or more other encoded parameters that (i) are not expressed as natural language representations in the uniform resource identifier and (ii) represent one or more second search parameters that each indicate a criterion for selecting search results, wherein the additional representation is not a natural language representation;

identifying, by the uniform resource identifier interpreter of the search engine, (i) the one or more first search parameters from the one or more path segments that are natural language representations and (ii) the one or more second search parameters using the additional representation of the one or more other encoded parameters that are not natural language representations in the uniform resource identifier;

performing, by a results generator of the search engine, a search by comparing records of a search index with the one or more first search parameters and the one or more second search parameters, wherein the records of the search index comprise keyword data derived from multiple sources over the network, and wherein the search identifies results based at least in part on the keyword data; and providing, by the search engine, a set of the results of the search over the network for display by the client device.

34. The one or more non-transitory storage devices of claim 33, wherein the additional representation is a session identifier; and wherein identifying the one or more second search parameters comprises using the session identifier in the uniform resource identifier to obtain the one or more other encoded parameters that represent the one or more second search parameters that are not represented by natural language representations in the uniform resource identifier.

35. The one or more non-transitory storage devices of claim 33, the operations further comprising:

displaying the uniform resource identifier;

receiving a user modification of a first natural language representation in the uniform resource identifier to generate a modified uniform resource identifier;

performing a modified search by the search engine using the modified uniform resource identifier as a search request; and displaying results of the modified search.

36. The one or more non-transitory storage devices of claim 35, wherein:

the first natural language representation comprises one or more words that describe a respective search parameter and one or more filter values that are associated with the respective search parameter; and receiving a user modification of the first natural language representation comprises receiving a modification of at least one of the one or more filter values.

37. The one or more non-transitory storage devices of claim 33, the operations further comprising formulating a search query based on the identified search parameters, wherein performing the search comprises executing the search query.

* * * * *